United States Patent
Hall et al.

(10) Patent No.: US 7,789,455 B2
(45) Date of Patent: Sep. 7, 2010

(54) DEFORMABLE PULL CUP ARRANGEMENT AND METHOD OF ASSEMBLY

(75) Inventors: Ian Hall, Ann Arbor, MI (US); John Pinkerton, Canton, MI (US); Jeff Chickola, Dearborn, MI (US); Brian Spahn, Plymouth, MI (US); A. Mangala Jayasuriya, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 522 days.

(21) Appl. No.: 11/744,527

(22) Filed: May 4, 2007

(65) Prior Publication Data

US 2008/0272614 A1 Nov. 6, 2008

(51) Int. Cl.
*B60N 3/02* (2006.01)
*B60R 21/04* (2006.01)

(52) U.S. Cl. .................. 296/187.05; 296/187.12; 296/146.7; 296/1.09

(58) Field of Classification Search ............ 296/187.05, 296/146.7, 153, 1.09, 187.12; 280/748, 751
See application file for complete search history.

(56) References Cited

U.S. PATENT DOCUMENTS

| | | | | |
|---|---|---|---|---|
| 2,922,674 A * | 1/1960 | Hollerbach | ............... | 296/153 |
| 5,181,759 A * | 1/1993 | Doolittle | ............... | 296/153 |
| 5,527,084 A * | 6/1996 | Scherf | ............... | 296/153 |
| 5,749,600 A * | 5/1998 | Yamada et al. | ............... | 280/751 |
| 6,568,743 B1 | 5/2003 | Jayasuriya et al. | | |
| 6,893,077 B1 * | 5/2005 | DeJongh | ............... | 296/187.05 |
| 6,983,967 B2 * | 1/2006 | Scheidmantal et al. | ..... | 296/1.09 |
| 7,121,611 B2 * | 10/2006 | Hirotani et al. | ........... | 296/146.7 |
| 7,222,910 B1 * | 5/2007 | Doan et al. | ............... | 296/153 |
| 7,503,621 B2 * | 3/2009 | Mani | ............... | 296/187.05 |
| 7,549,689 B2 * | 6/2009 | Pinkerton et al. | ........... | 296/1.02 |
| 7,556,301 B2 * | 7/2009 | Govind et al. | ............... | 296/24.34 |
| 2002/0149222 A1 | 10/2002 | Heranney | | |
| 2005/0023861 A1 | 2/2005 | Hirotani et al. | | |
| 2006/0043764 A1 | 3/2006 | Schroder et al. | | |
| 2007/0246968 A1 * | 10/2007 | Gokhale et al. | ............... | 296/153 |
| 2008/0272614 A1 * | 11/2008 | Hall et al. | ............... | 296/146.7 |
| 2009/0134659 A1 * | 5/2009 | Hall et al. | ............... | 296/146.7 |
| 2009/0134660 A1 * | 5/2009 | Pinkerton et al. | ........... | 296/146.7 |

* cited by examiner

*Primary Examiner*—Glenn Dayoan
*Assistant Examiner*—Gregory Blankenship
(74) *Attorney, Agent, or Firm*—Shook, Hardy & Bacon L.L.P.

(57) ABSTRACT

A pull cup in a vehicle door is fitted to a door trim panel substrate and is connected to the door inner sheet metal panel of the vehicle door by way of a bracket or by one of a pair of inner and outer support brackets. The pull cup is provided with a bending initiator feature which is positioned a trigger area formed in the door trim panel substrate. In the event that a horizontal force is applied to the vehicle door, the vehicle inward movement of the door inner sheet metal panel causes the pull cup to be pushed upward. The bending initiator feature pushes on the trigger area causing the door trim panel substrate to buckle, thus substantially preventing vehicle inward movement of the door trim panel substrate during the impact event. The bending initiator feature also reduces the lateral stiffness of the door trim sub-system.

15 Claims, 8 Drawing Sheets

DEFORMABLE PULL CUP ARRANGEMENT AND METHOD OF ASSEMBLY

TECHNICAL FIELD

The present invention relates generally to a pull cup of an armrest for use with a vehicle. More specifically, the present invention relates to a deformable pull cup arrangement which is strong and durable under normal use but which will demonstrate compromised lateral stiffness in the event of a side impact.

BACKGROUND OF THE INVENTION

It is known in vehicles to provide an armrest in a door having an integrated pull cup to allow the occupant to pull the door shut. According to the known arrangement, the pull cup, typically composed of a molded plastic, is anchored to the vehicle door inner panel by a variety of structures. In addition to being anchored to the vehicle door inner panel, the pull cup is also solidly connected to the armrest substrate.

The known approach to anchoring the pull cup to both the vehicle door inner panel as well as the armrest substrate provides a good degree of lateral door function to the vehicle occupant while opening and, particularly, closing the door. However, as in so many areas of vehicle technology, there is room in the art of vehicle interior door design for an alternative configuration to known pull cup support structures which will allow the translation of horizontal force impacting the vehicle door in the event of an impact to vertical movement which deforms or buckles a portion of the pull cup support structure to thereby prevent or minimize the movement of the armrest and its associated structure vehicle inward into the passenger area.

SUMMARY OF THE INVENTION

The present invention provides an alternative arrangement to known vehicle door pull cup and support structure designs. According to the present invention, the door pull cup is fitted into an aperture defined in the door trim panel substrate. The pull cup is attached to the door inner sheet metal panel by a bracket. The bracket may be either a bracket which is attached to both the pull cup and to the door inner sheet metal panel or may be an inner bracket attached between the door trim panel substrate and the pull cup supplemented by an outer bracket attached between the door inner sheet metal panel and the pull cup.

The pull cup includes a bending initiator feature which may take the form of a "money clip" tab, a wedge, or a slotted tab. The bending initiator feature is positioned beneath or otherwise adjacent to a trigger area formed in the door trim panel substrate. In the event of an impact upon the vehicle door, the door inner sheet metal panel is pushed horizontally in a direction that is vehicle inward. The bracket arrangement between the door inner sheet metal panel and the pull cup causes the horizontal movement to be translated into vertical or upward movement, driving the pull cup in a like direction. The bending initiator feature of the pull cup acts upon the trigger area, effecting a buckling of the trigger area and preventing the door trim panel substrate from being pushed inward into the passenger area of the vehicle. The bending initiator feature also reduces the lateral stiffness of the door trim subsystem.

Various methods of assembly are provided and include both vertical insertion and rotation of the pull cup into an opening formed in the door trim panel substrate until attachment is achieved or vertical insertion followed by rotation of the pull cup about its z-axis until attachment is achieved. Regardless of the method of assembly the pull cup is anchored to the supporting bracket or to the inner/outer support brackets by one or more fasteners.

Other advantages and features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
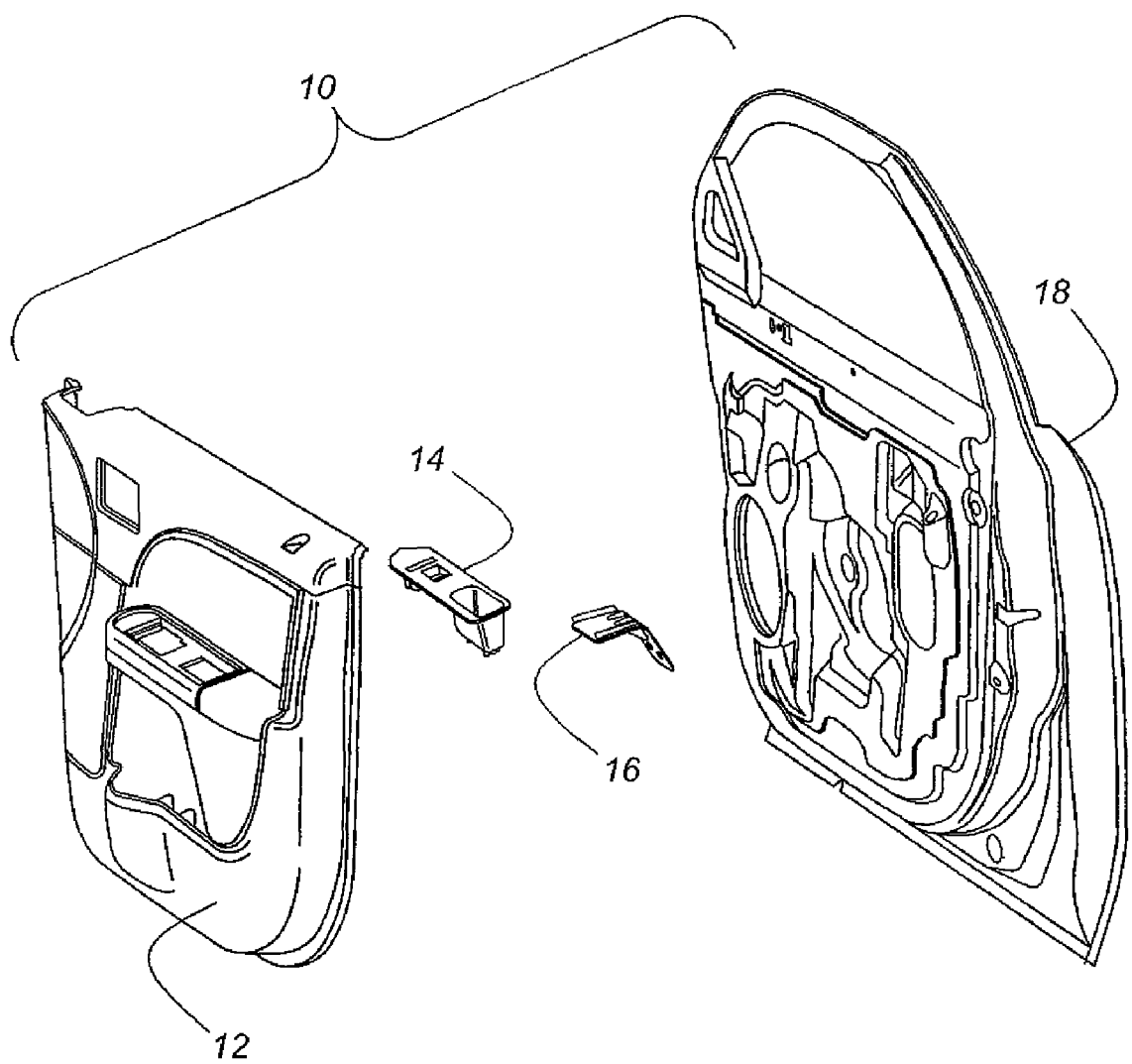
FIG. 1 illustrates an exploded view of the assembly of the present invention and particularly illustrates the door trim, the pull cup, the supporting bracket, and the door inner sheet metal panel.

In the accompanying figures, the same reference numerals will be used to refer to the same components. In the following description, various operating parameters and components are described for different constructed embodiments. These specific parameters and components are included as examples and are not meant to be limiting.

With reference first to FIG. 1, an exploded view of the door sub-assembly of the present invention, generally illustrated as 10, is shown. The door sub-assembly 10 includes a door trim panel substrate 12, a pull cup 14, a supporting bracket 16, and a door inner sheet metal panel 18. The door trim panel substrate 12 provides support for the pull cup 14. The door trim panel substrate 12 as shown is for illustrative purposes only and it is to be understood that a variety of trim panel configurations may be adapted for use in the present invention. The illustrated pull cup 14 is one of three preferred pull cup embodiments shown in the various figures and discussed below in relation thereto.

Figure 2:
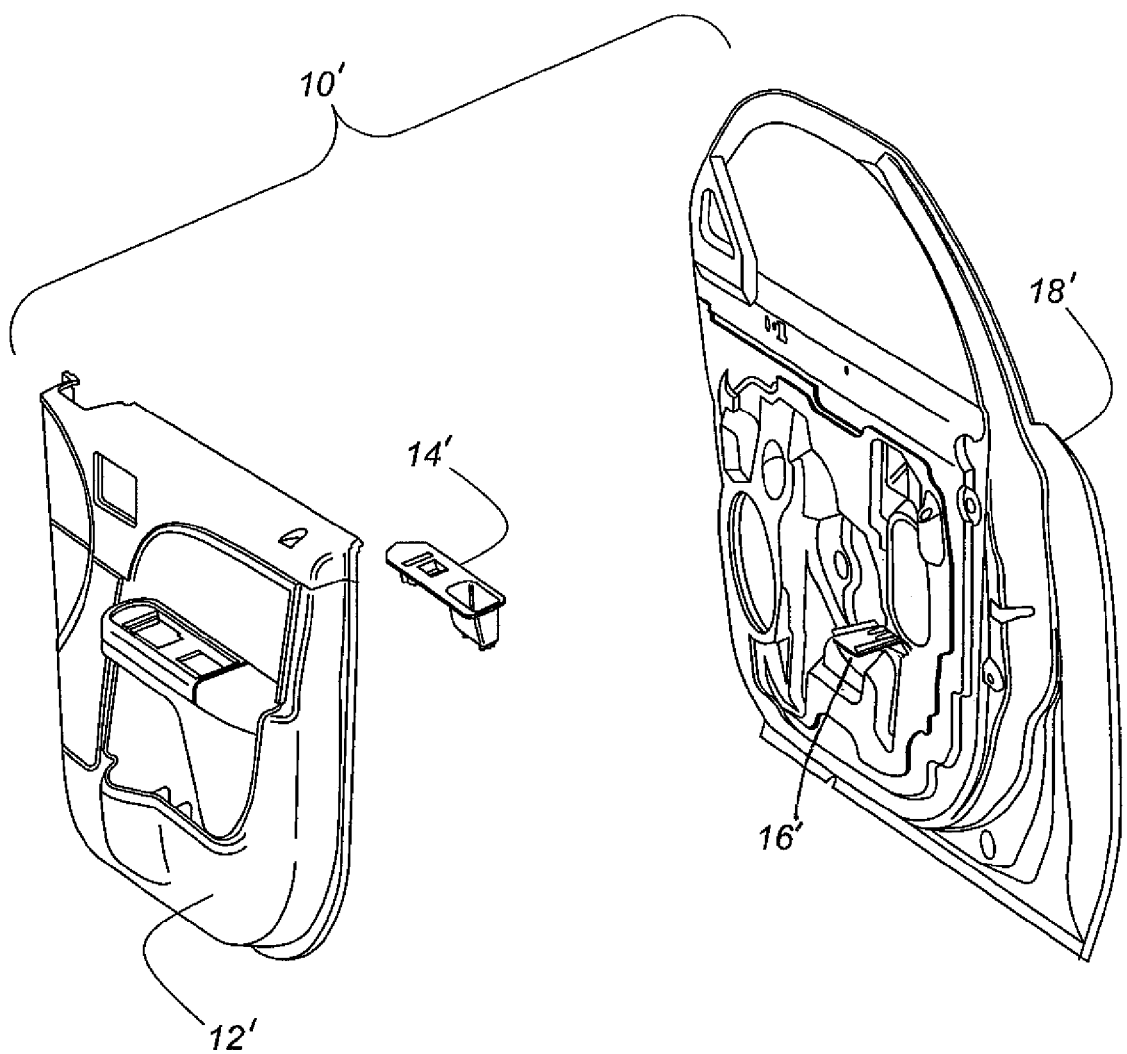
FIG. 2 illustrates an exploded view of an alternate embodiment of the assembly of the present invention and particularly illustrates the door trim, the pull cup, the door inner sheet metal panel, and a supporting bracket integral with the door inner sheet metal panel.

With reference to FIG. 2, an exploded view of an alternate embodiment of the door sub-assembly of the present invention, generally illustrated as 10', is shown. The door sub-assembly 10' includes a door trim panel substrate 12', a pull cup 14', a supporting bracket 16', and a door inner sheet metal panel 18'. Unlike the configuration of FIG. 1, the supporting bracket 16' is integral with the door inner sheet metal panel 18'.

Figure 3:
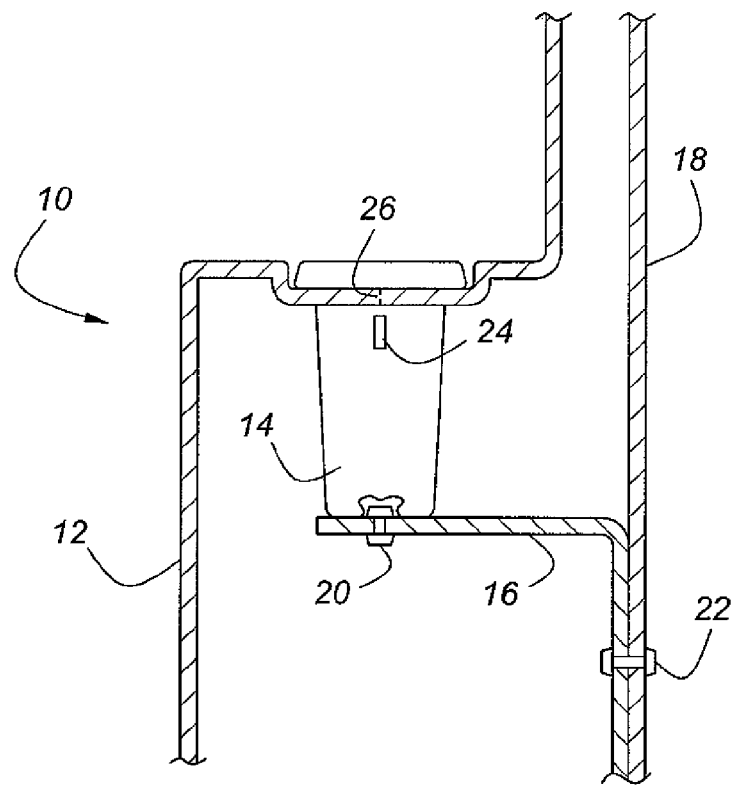
FIG. 3 illustrates a sectional view of the door trim, pull cup, supporting bracket and door inner sheet metal assembly according to a first embodiment of the present invention.

While exploded views of the door sub-assembly of the present invention are shown in FIG. 1 and in FIG. 2, FIG. 3 illustrates a sectional view of the door sub-assembly 10 of the present invention. Preferred but not limiting configurations of the door trim panel substrate 12, the pull cup 14, the supporting bracket 16 and the door inner sheet metal panel 18 are shown. The pull cup 14 is fixedly attached to the supporting bracket 16 by a fastener 20. The supporting bracket 16 is fixedly attached to the door inner sheet metal panel 18 by a fastener 22. The fasteners 20, 22 are of the mechanical fastening type as is known to those skilled in the art. The mechanical fastening shown herein may include conventional fasteners such as nuts, bolts, rivets, snap fittings and the like. Regardless of the selected fastener, according to the present invention the pull cup 14 is securely attached to the door inner sheet metal panel 18. This hard attachment of the pull cup 14 to the door inner sheet metal panel 18 provides a high degree of structural integrity.

The pull cup 14 is fitted with a bending initiator feature 24. Various configurations of the bending initiator feature 24 are illustrated and discussed with respect to FIGS. 7 through 11. Regardless of the configuration, the bending initiator feature 24 is provided in an area of the pull cup 14 adjacent to a trigger area 26 formed in the door trim panel substrate 12. The trigger area 26 is a weakened area at which an upward buckle (effected by the upward movement of the pull cup 14 and its associated bending initiator feature 24) is formed in the event of an impact on the door inner sheet metal panel 18. The trigger area 26 may be formed by a variety of methods, such methods including forming a groove in the underside of the door trim panel substrate 12 or forming a slot in the door trim panel substrate 12 to accept a bending initiator feature 24. The presence of the trigger area 26 notwithstanding, the durability of the door trim panel substrate 12 and hence the entire door sub-assembly 10 is not significantly impacted by the presence of the trigger area 26 thus relevant vehicle impact testing standards can still be met or exceeded.

Figure 4:
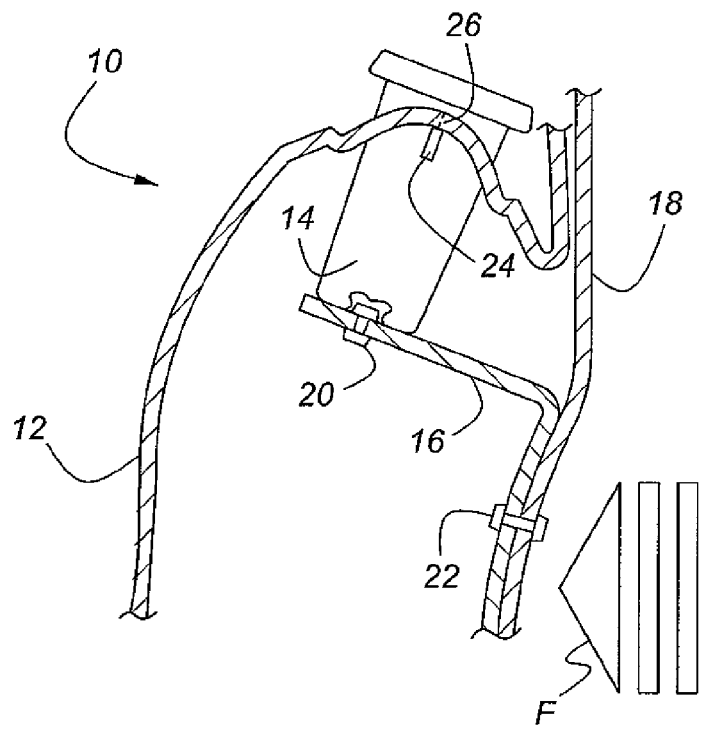
FIG. 4 illustrates the assembly of FIG. 3 but after the application of a side impact force.

As illustrated in FIG. 3 and FIG. 4, the bending initiator feature 24 is positioned to apply force on the trigger area 26 in the event that a side force is applied to the door inner sheet metal panel 18 as illustrated in FIG. 4. This figure is identical to FIG. 3 with the exception that a side force F has been applied to the door inner sheet metal panel 18.

With reference to FIG. 4, the side force F has been applied to the outer vehicle door panel (not shown) and this force has been transferred to the door inner sheet metal panel 18. As the door inner sheet metal panel 18 is forced in, the supporting bracket 16 is pushed laterally and rotates such that the end of the bracket 16 to which the pull cup 14 is fastened is moved upward and, consequently, the lateral movement is translated into vertical movement, which is imparted to the pull cup 14. The pull cup 14 thus is moved upward. The bending initiator feature 24 acts upon the trigger area 26 so that a portion of the door trim panel substrate 12 is buckled as the pull cup 14 moves vertically, thereby preventing entirely or substantially movement of the door trim panel substrate 12 vehicle inward into the passenger area.

Only at the time of impact is the lateral stiffness of the door trim panel substrate 12 compromised. Normal usage will have no affect on the strength of the door trim panel substrate 12, thus durability is ordinarily unaffected. However, once the pull cup 14 moves and buckles the door trim panel substrate 12, the lateral stiffness of the door trim panel substrate 12 is reduced.

Figure 5:
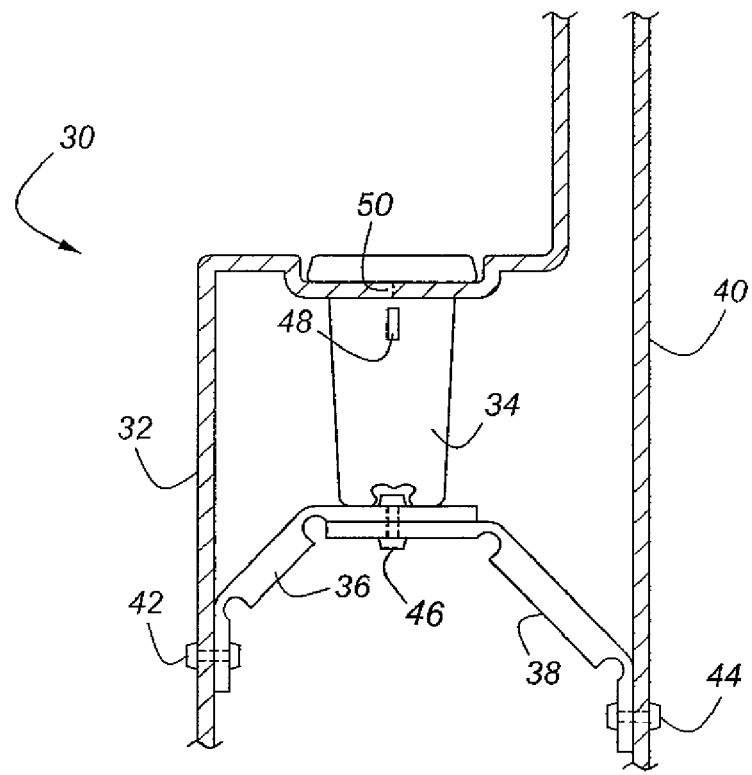
FIG. 5 illustrates a sectional view of the door trim, pull cup, supporting inner side bracket, supporting outer side bracket, and the door inner sheet metal assembly according to a second embodiment of the present invention.

An alternate embodiment of the present invention is illustrated in FIG. 5 in which sectional view of a door sub-assembly, generally illustrated as 30, is shown prior to side impact. The door sub-assembly 30 includes a door trim panel substrate 32, a pull cup 34, a pull cup supporting inner side bracket 36, a pull cup supporting outer side bracket 38, and a door inner sheet metal panel 40. The pull cup supporting inner side bracket 36 is fastened to the door trim panel substrate 32 by a fastener 42 and the pull cup supporting outer side bracket 38 is fastened to the door inner sheet metal panel 40 by a fastener 44. Both the pull cup supporting inner side bracket 36 and the pull cup supporting outer side bracket 38 are attached to the pull cup 34 by a fastener 46.

A bending initiator feature 48 is formed on the pull cup 34. A trigger area 50 is formed on the door trim panel substrate 32. Both the bending initiator feature 48 and the trigger area 50 are consistent in design and function with the bending initiator feature 24 and the trigger area 26 shown in FIGS. 3 and 4 and discussed above in conjunction therewith.

Figure 6:
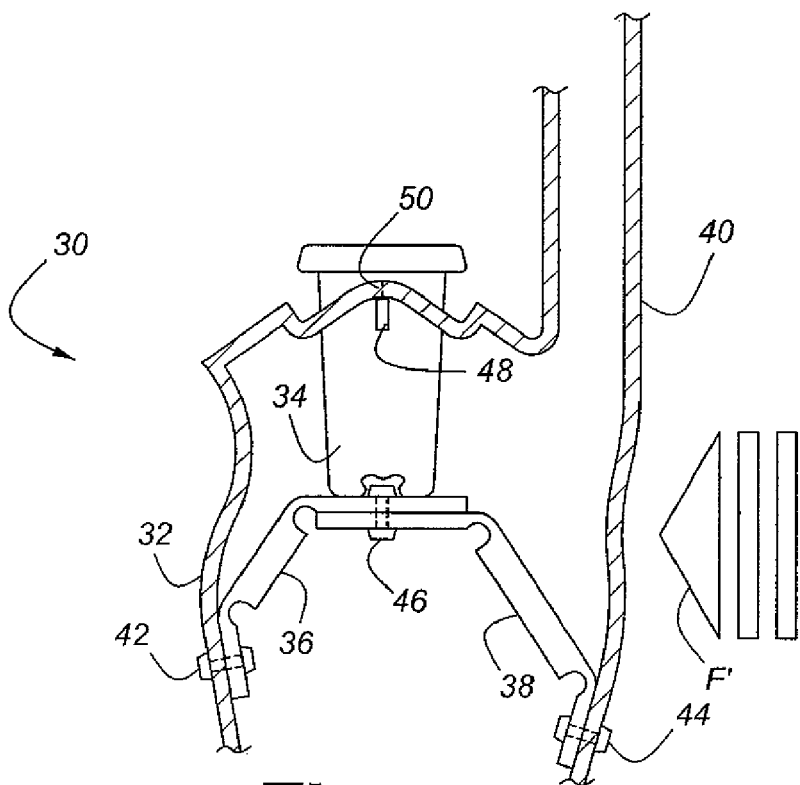
FIG. 6 illustrates the assembly of FIG. 5 but after the application of a side impact force.

In the event of an impact caused by a force F' on the vehicle door outer sheet metal panel (not shown), a deformation of the door trim panel substrate 32 occurs as illustrated in FIG. 6. Specifically, the lateral force F' upon the door inner sheet metal panel directly effects substantially vertical movement of the pull cup supporting outer side bracket 38 upward and indirectly effects substantially vertical movement of the pull cup supporting inner side bracket 36 upward as well, fastened as it is to the pull cup supporting outer side bracket 38 by the fastener 46. At substantially the same time the pull cup supporting outer side bracket 38 translates lateral movement into vertical movement and the pull cup 34 is forced upward. As the pull cup 34 moves upward the integral bending initiator feature 48 is moved upward as well, applying force upon the weakened area of the door trim panel substrate 32 defined by the trigger area 50. The trigger area 50 and the area of the door trim panel substrate 32 adjacent to it are buckled, as illustrated in FIG. 6. As a result of this configuration, the horizontal force F' which would otherwise push the door trim panel substrate 32 vehicle inward is translated into vertical movement, thus preventing entirely or substantially movement of the door trim panel substrate 32 vehicle inward toward the passenger area. The arrangement shown in FIG. 5 and FIG. 6 reduce the lateral compressive stiffness which may interact with the occupant if there is vehicle inward movement.

Figure 7:
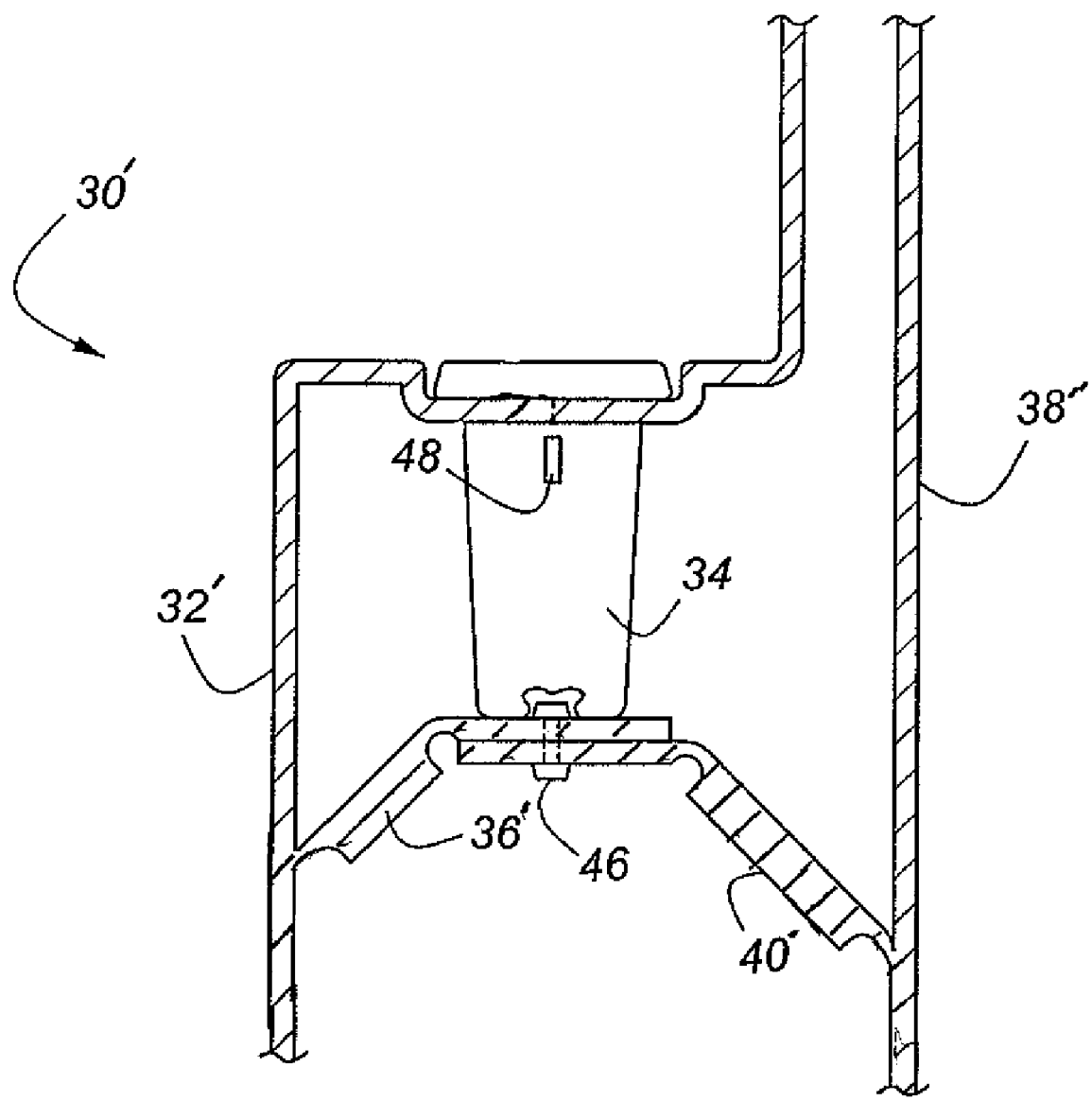
FIG. 7 illustrates an alternate embodiment of the second embodiment of the present invention shown in FIGS. 5 and 6.

A variation of the embodiment of the pull cup and adjacent door trim panel shown in FIGS. 5 and 6 is illustrate in FIG. 7 in which a sectional view of a door sub-assembly, generally illustrated as 30'. The door sub-assembly 30' includes a door trim panel substrate 32', the pull cup 34, a pull cup supporting inner element 36' which is integral with the door trim panel substrate 32', a door inner sheet metal panel 38', and a pull cup supporting outer element 40' which is integral with the door inner sheet metal panel 38'.

A fastener 46 is provided to attach the pull cup 34 to the pull cup supporting inner element 36' and to the pull cup supporting outer element 40'.

As noted above, various configurations for the pull cup and the adjacent door trim panel substrate may be used in the present invention. These configurations are presented in FIGS. 8 through 12 and are discussed in conjunction therewith. These figures disclose three preferred embodiments of the present invention. However, the embodiments are to be taken as suggestive but not limiting and it is to be understood that other configurations may be used while still achieving the objectives of providing a pull cup having a bending initiator feature and a door trim panel having a trigger area.

Figure 8:
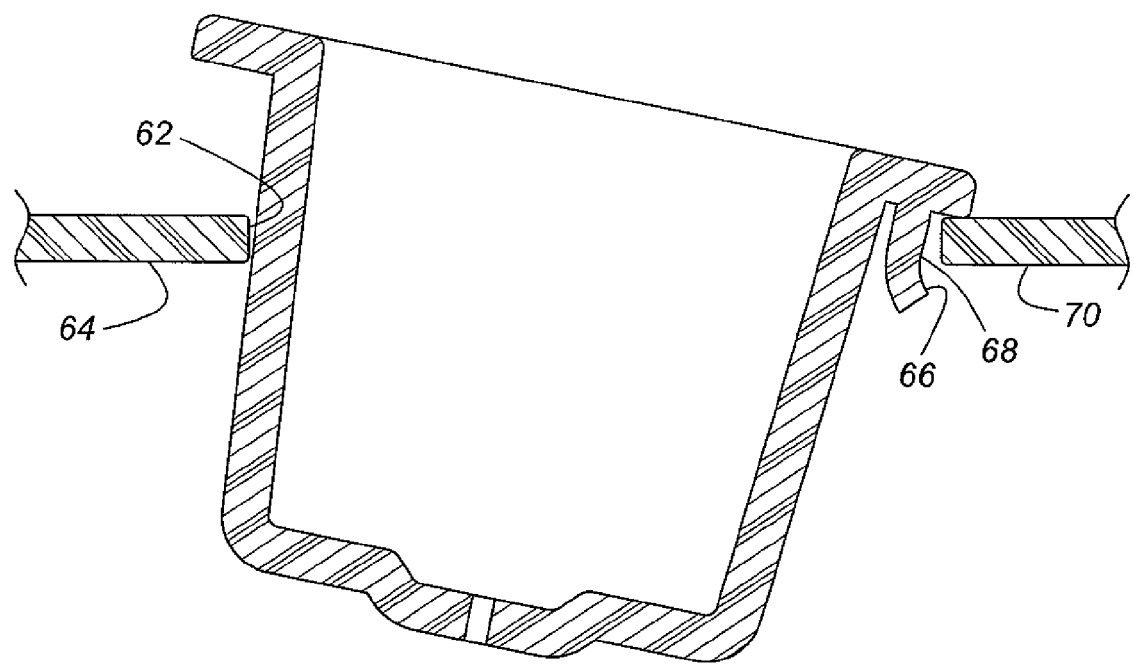
FIG. 8 illustrates a sectional view of a first preferred pull cup design and the adjacent door trim substrate as the pull cup is being installed into the door trim substrate.

With respect to the first pull cup embodiment illustrated in FIG. 8, a pull cup 60 is shown relative to an opening 62 defined in a portion of a door trim panel substrate 64. The pull cup 60 is illustrated as being partially installed in the door trim panel substrate 64. The pull cup 60 is fitted with a bending initiator feature 66 of the "money clip" variety having an open end 68. To fit the pull cup 60 to the door trim panel substrate 64 the assembler installs the pull cup 60 money clip-end first (as illustrated) into the opening 62 defined in the door trim panel substrate 64. The pull cup 60 is then rotated about the bending initiator feature 66 interface to the door trim panel substrate 64. At the approximate interface of the bending initiator feature 66 and the door trim panel substrate 64, the interface being generally illustrated as 70, a trigger area is formed. The pull cup 60 is then fastened to either the bracket of FIGS. 3 and 4 or the pull cup supporting inner/outer side bracket combination of FIGS. 5 and 6 as the case may be using a fastener (not shown).

In operation, and still referring to FIG. 8, in the event that there is a side impact to the vehicle which applies force against the door inner sheet metal panel (not shown) which moves the pull cup 60 upward via either the bracket of FIGS. 3 and 4 or the pull cup supporting inner/outer side bracket combination of FIGS. 5 and 6, the bending initiator feature 66 applies upward force against the trigger area 70, thus bending the door trim panel substrate 64 in a controlled and substantially predictable manner.

Figure 9:
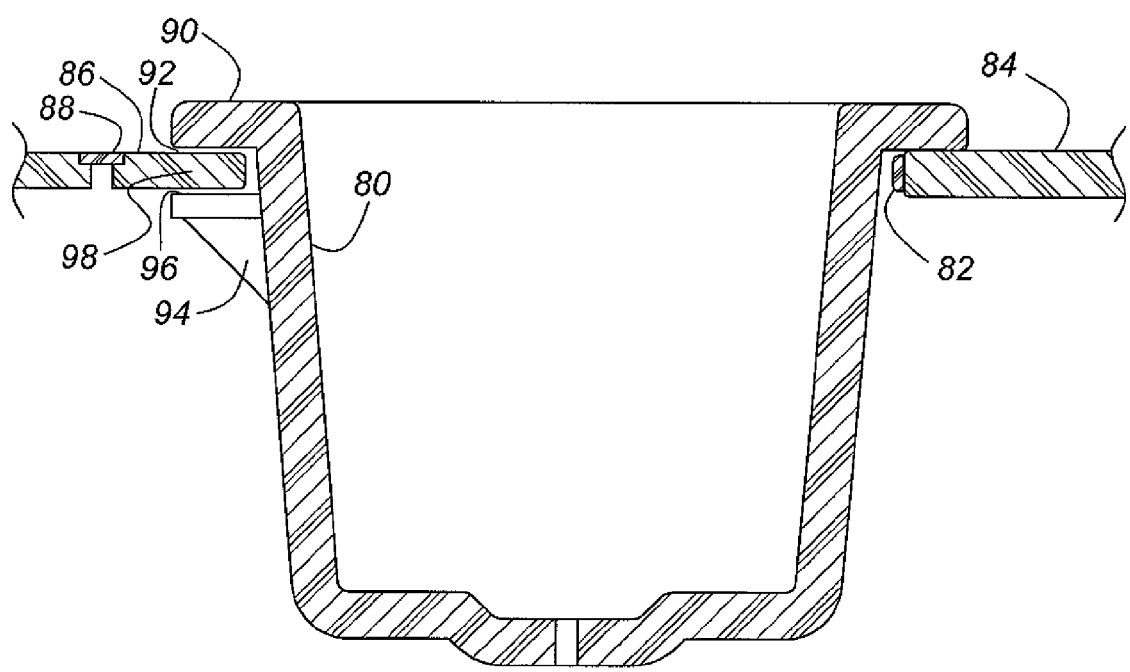
FIG. 9 illustrates a sectional view of a second preferred pull cup design and the adjacent door trim substrate after the pull cup has been installed into the door trim substrate.

With respect to the second pull cup embodiment illustrated in FIG. 9, a pull cup 80 is shown in position in an opening 82 formed in a door trim panel substrate 84. Part of the opening 82 of the door trim panel substrate 84 includes a hinged area 86 that is attached to the door trim panel substrate 84 by a flexible bridge 88. The flexible bridge 88 is composed of a resilient material.

The pull cup 80 includes a peripheral lip 90 which has an underside 92. The pull cup 80 further includes a bending initiator feature 94 in the shape of a wedge having an upper surface 96 that is spaced apart from the underside 92 of the peripheral lip 90. Attachment of the pull cup 80 to the door trim panel substrate 84 is accomplished by inserting the end of the pull cup 80 not having the wedge 94 into the opening 82. The end of the pull cup 80 having the bending initiator feature 94 is then pushed into the installed position illustrated in FIG. 9. As is understood by one having skill in the art, the hinged area 86 is forced downward by the bending initiator feature 94 and flexes at the flexible bridge 88 to allow passage of the wedge 94 thereby. Once the bending initiator feature 94 has passed, the hinged area 86 springs back into place to achieve the position illustrated in FIG. 9. At the approximate interface of the bending initiator feature 94 and the door trim panel substrate 84, the interface being generally illustrated as 98, a trigger area is formed. Once installed in the position shown, a fastener is used to attach the pull cup 80 to either the bracket of FIGS. 3 and 4 or the pull cup supporting inner/outer side bracket combination of FIGS. 5 and 6, as the case may be.

In operation, and still referring to FIG. 9, in the event that there is a side impact to the vehicle which applies force against the door inner sheet metal panel (not shown) which moves the pull cup 80 upward via either the bracket of FIGS. 3 and 4 or the pull cup supporting inner/outer side bracket combination of FIGS. 5 and 6, the bending initiator feature 94 applies upward force against the trigger area 98, thus bending the door trim panel substrate 84 in the manner discussed above.

Figure 10:
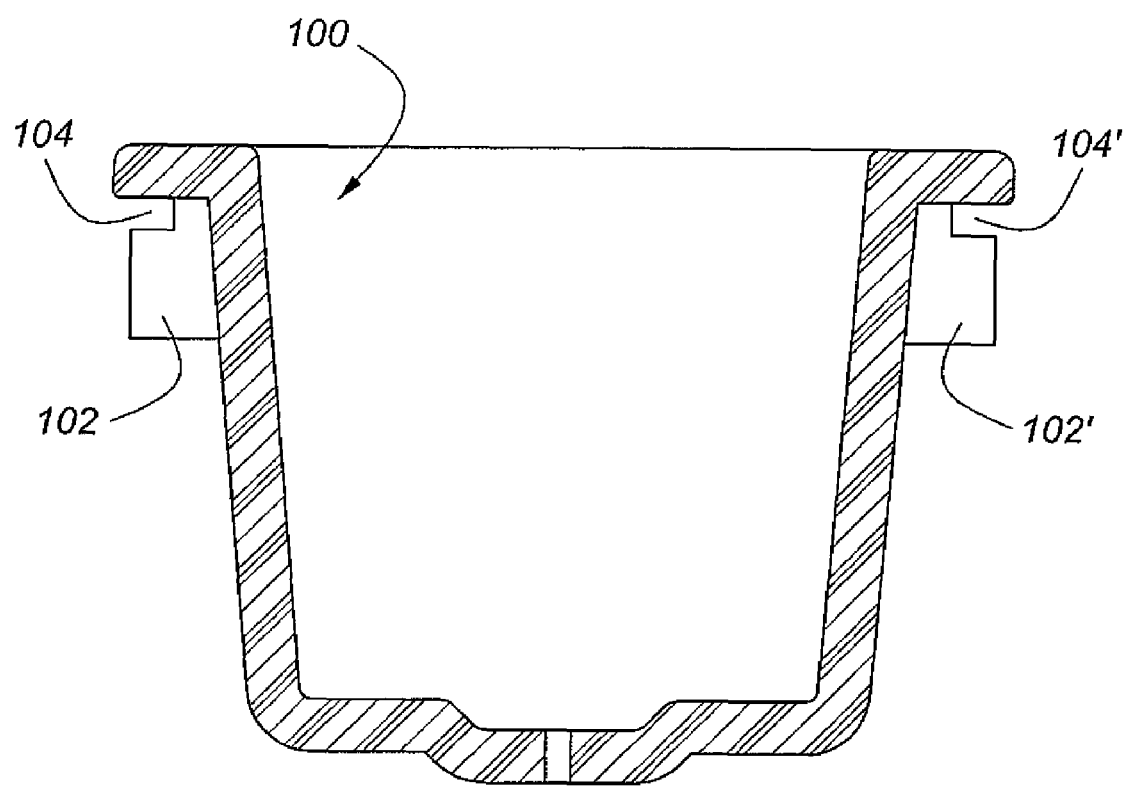
FIG. 10 illustrates a sectional view of a third preferred pull cup design according to the present invention.

The third embodiment of the pull cup of the present invention is illustrated in FIG. 10. A technique for attaching this embodiment of the pull cup to the door trim panel substrate is illustrated in FIGS. 11 and 12.

As shown in FIG. 10, the third embodiment of the pull cup of the present invention, generally illustrated as 100, includes a pair of opposed bending initiator features 102, 102' which extend from the pull cup 100. Each of the opposed bending initiator features 102, 102' includes a notch 104, 104' respectively formed therein.

Figure 11:
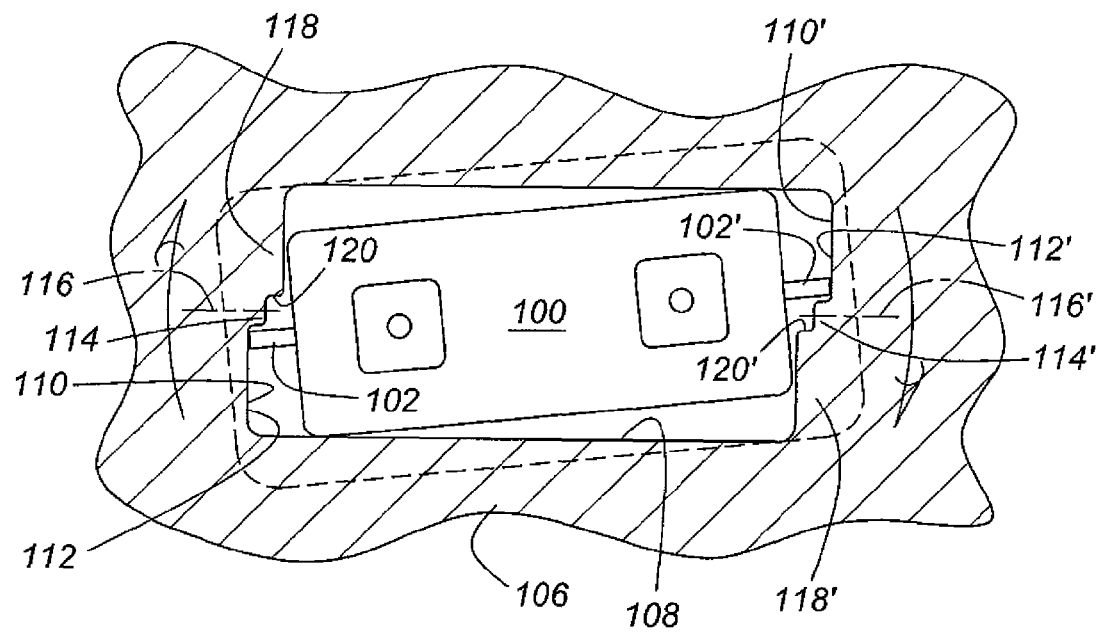
FIG. 11 illustrates a bottom side view of the third preferred pull cup design of FIG. 10 and the adjacent door trim substrate after the pull cup has been preliminarily installed into the pull cup-receiving opening formed in the door trim substrate.
Figure 12:
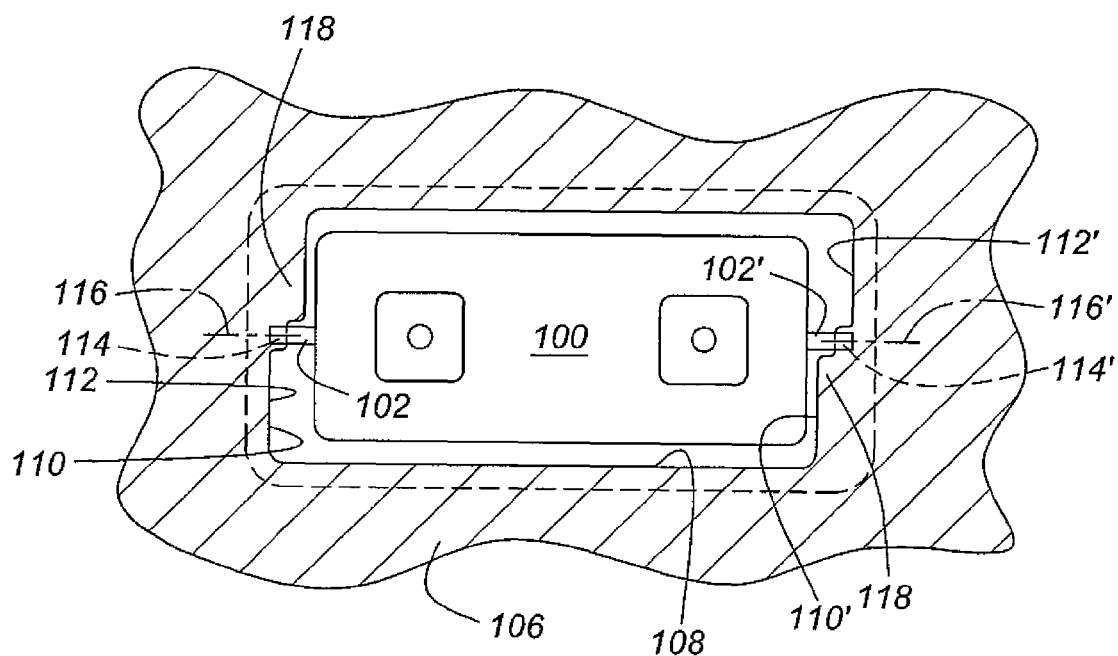
FIG. 12 illustrates the same view of that of FIG. 11 but shows the pull cup after having been rotated to its installed and locked position.

The pull cup 100 is attached to a door trim panel substrate 106, shown in FIGS. 11 and 12. The door trim panel substrate 106 has a pull cup receiving aperture 108 formed therein. The aperture 108 includes a pair of opposed end walls 110, 110'. The following description of the end wall 110 is made for illustrative purposes with the understanding that the end wall 110' is configured in the same manner, the features of which being marked by primed numbers.

The end wall 110 (110') includes a recessed wall 112 (112'). The recessed wall 112 (112') allows the installer to vertically insert the pull cup 100 into the aperture 108. The end wall 110 (110') further includes a first step 114 (114') which both engages the bending initiator feature 102 (102') and defines a trigger area 116 (116'). The trigger area 116 (116') is formed as discussed above. The end wall 110 (110') additionally includes a second step 118 (118') having a wall 120 (120') formed thereon.

Attachment of the pull cup 100 to the door trim panel substrate 106 is accomplished by a two step process. The first of these steps is illustrated in FIG. 10. The pull cup 100 is installed at a slight angle as illustrated relative to the long axis of the aperture 108. This approach allows the bending initiator feature 102 (102') to clear the end wall 110 (110') because of the relatively wide opening defined by the recessed wall 112 (112').

Once the pull cup 100 is placed in the initial position illustrated in FIG. 11, the installer rotates the pull cup 100 about the z-axis of the pull cup 100 to the locked position as shown in FIG. 12. In this position the notch 104 of the bending initiator feature 102 is engaged with the first step 114 of the end wall 110 and the notch 104' of the bending initiator feature 102' is engaged with the first step 114' of the end wall 110'. Rotation of the pull cup 100 to the engaged and locked position illustrated in FIG. 12 is stopped once the bending initiator feature 102 abuts the wall 120 of the second step 118 and the bending initiator feature 102' abuts the wall 120' of the second step 118'. Once installed in the position shown, a fastener is used to attach the pull cup 100 to either the bracket of FIGS. 3 and 4 or the pull cup supporting inner/outer side bracket combination of FIGS. 5 and 6, as the case may be.

In operation, and referring to FIG. 12, in the event that there is a side impact to the vehicle which applies force against the door inner sheet metal panel (not shown) which moves the pull cup 100 upward via either the bracket of FIGS. 3 and 4 or the pull cup supporting inner/outer side bracket combination of FIGS. 5 and 6, the bending initiator feature 102 applies upward force against the trigger area 116 and the bending initiator feature 102' applies upward force against the trigger area 116', thus bending the door trim panel substrate 106 in the manner discussed above.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A door assembly for use in a vehicle comprising:
a pull cup having a bending initiator;
a door trim panel substrate having a pull cup-receiving opening formed therein, said door trim panel substrate having a weakened area, said weakened area being substantially adjacent said bending initiator when said pull cup is in position in said opening;
a door inner sheet metal panel; and
a support bracket connecting said pull cup and said door trim panel, said pull cup including a top having a peripheral edge, said peripheral edge having an underside, said bending initiator comprising a door trim panel substrate engagement flange extending from said underside of said peripheral edge of said pull cup.

2. The door assembly of claim 1 wherein said weakened area is a groove formed in said door trim panel substrate.

3. The door assembly of claim 1 wherein said weakened area is a notch formed in said door trim panel substrate.

4. The door assembly of claim 1 wherein said support bracket is fastened to said door inner sheet metal panel.

5. The door assembly of claim 1 wherein said support bracket is integral with the door inner sheet metal panel.

6. The door assembly of claim 1 further including a second support bracket between said door trim panel substrate and said pull cup, said second support bracket being fastened to said door trim panel substrate.

7. The door assembly of claim 1 further including a second support bracket between said door trim panel substrate and said pull cup, said second support bracket being integral with said door trim panel substrate.

8. The door assembly of claim 1 wherein said pull cup-receiving opening has an end, said end including a bending initiator area for engagement of said bending initiator and a wall against which said bending initiator feature abuts when said pull cup is fitted into said door trim panel substrate.

9. A pull cup for use in a vehicle door assembly having a door trim panel with a weakened area and a pull cup-receiving opening, a door inner sheet metal panel, and a structure connecting the pull cup to the door inner sheet metal panel, the pull cup comprising:
a substantially hollow body connected to the structure connecting the pull cup to the door inner sheet metal panel, said body having a side; and
a bending initiator extending from said side of said body and being positioned substantially adjacent the weakened area of the door trim panel when the pull cup is fitted to the door trim panel, said pull cup including a side and a top, said top having a peripheral edge formed thereon, said peripheral edge having an underside, and wherein said bending initiator comprises a door trim panel substrate engagement flange extending from said side of the pull cup, said door trim panel substrate engagement flange being spaced apart from said underside of said peripheral edge to define a door trim panel substrate engagement slot.

10. The door assembly of claim 9 wherein a portion of said door trim panel substrate engagement flange is attached to said underside of said peripheral edge to define a notched area and wherein said door trim panel substrate has a notch at said weakened area, said notched area of said door trim panel substrate engagement flange and said notch of said weakened area being engaged with one another when the pull cup is inserted into said pull cup-receiving opening.

11. A door assembly for use in a vehicle comprising:
a pull cup having a bending initiator feature;
a door trim panel substrate including an aperture for said pull cup and further having a weakened area formed adjacent to said aperture;
a door inner sheet metal panel; and
a support bracket connecting said pull cup and said panel, whereby a substantially horizontal impacting force applied against the panel is translated into substantially vertical movement of said pull cup through said support bracket, thus effecting movement of said bending initiator feature against said weakened area and causing said substrate to partially buckle.

12. The door assembly of claim 11 wherein said pull cup includes a top, said top having a peripheral edge formed thereon, said peripheral edge having an underside, and wherein said bending initiator feature comprises a door trim panel substrate engagement flange extending from said underside of said peripheral edge of said pull cup.

13. The door assembly of claim 11 wherein said pull cup includes a side and a top, said top having a peripheral edge formed thereon, said peripheral edge having an underside, and wherein said bending initiator feature comprises a door trim panel substrate engagement flange extending from said side of said pull cup, said door trim panel substrate engagement flange being spaced apart from said underside of said peripheral edge to define a door trim panel substrate engagement slot.

14. The door assembly of claim 13 wherein a portion of said door trim panel substrate engagement flange is attached to said underside of said peripheral edge to define a notched area and wherein said door trim panel substrate has a notch at said weakened area, said notched area of said door trim panel substrate engagement flange and said notch of said weakened area being engaged with one another when said pull cup is inserted into said pull cup-receiving opening.

15. The door assembly of claim 11 further including a second support bracket between said door trim panel substrate and said pull cup.

* * * * *